//USP 3,629,696

United States Patent

[11] 3,629,696

[72] Inventor Everhard H. B. Bartelink
 Concord, N.H.
[21] Appl. No. 750,524
[22] Filed Aug. 6, 1968
[45] Patented Dec. 21, 1971
[73] Assignee Northeast Electronics Corporation
 Concord, N.H.

[54] METHOD AND APPARATUS FOR MEASURING DELAY DISTORTION INCLUDING SIMULTANEOUSLY APPLIED MODULATED SIGNALS
15 Claims, 5 Drawing Figs.

[52] U.S. Cl. .................................... 324/57 R,
 179/175.3, 324/85
[51] Int. Cl. ................................... G01r 27/00
[50] Field of Search ........................... 324/57 FP,
 57 MI, 57 DE, 85, 57 H; 179/175.3

[56] References Cited
UNITED STATES PATENTS

| | | | |
|---|---|---|---|
| 2,632,792 | 3/1953 | Selz | 324/57 |
| 2,781,450 | 2/1957 | Ianovchewsky | 324/57 UX |
| 2,877,409 | 3/1959 | Jacobsen et al. | 324/57 |
| 3,288,944 | 11/1966 | Fleming | 179/175.3 |
| 3,323,049 | 5/1967 | Hanken | 324/61 |
| 2,337,541 | 12/1943 | Burgess | 179/175.3 |
| 3,270,343 | 8/1966 | Bridges | 324/85 UX |

Primary Examiner—Edward E. Kubasiewicz
Attorney—Robert J. McElhannon

ABSTRACT: A common modulating signal is applied to a plurality of carrier signals of differing frequency to provide signals with phase coincident modulation envelopes. These are simultaneously transmitted across transmission circuit being investigated, received at distant terminal, and individually demodulated. Phase separation between demodulated envelopes is ascertained as indication of delay distortion in transmission circuit.

INVENTOR
EVERHARD H. B. BARTELINK
BY
Ward, McElhannon, Brooks & Fitzpatrick
ATTORNEYS.

METHOD AND APPARATUS FOR MEASURING DELAY DISTORTION INCLUDING SIMULTANEOUSLY APPLIED MODULATED SIGNALS

The present invention relates to a method and apparatus for measuring the delay distortion of a signal transmission circuit. More particularly, it relates to the determination of the phase distortion of such circuit over a band or range of frequencies.

In the communication field it is often necessary to know the amount of phase shift or phase distortion introduced by a signal transmission circuit over the frequency operating range of the circuit. Various techniques have been employed in the past for this purpose, but all have inherent drawbacks or disadvantages. Typically, measurements have been made in the past by providing a stable low frequency oscillator which modulates the output from a carrier frequency source. The modulated signal is transmitted over the circuit to be tested and is demodulated at the receiving end. The phase of the demodulated envelope is thereupon compared with the phase of the original modulating signal. This either requires the provision of a stable oscillator at the receiving end maintained accurately in phase with the oscillator at the transmitting end or the provision for sending the demodulated signal back to the transmitting end with a known or fixed delay. The measurement is repeated at a number of different carrier frequencies over the required range. Variation of the phase delay with carrier frequency can then be plotted or determined. This method requires a separate measurement for each individual carrier frequency and is time consuming.

It is an object of the present invention to provide apparatus and methods for measuring the phase delay which are free from the aforementioned disadvantages.

In accordance with one aspect of the invention there is provided a method for measuring the delay distortion of a signal transmission circuit between spaced input and output points therein which comprises the steps of applying simultaneously to the input point for transmission over the circuit a plurality of different frequency carrier signals, each of which has been modulated with the same modulating signal to produce modulation envelopes of coincident phase, receiving the modulated carrier signals at the output point, and determining any difference in phase between the modulation envelopes of the received signals. If desired, the transmitted test signals can be applied to the transmission circuit intermittently, and the information relative to the phase difference between the demodulated envelopes can be transmitted back to the input point in the intervals between the transmission of the test signals.

In accordance with a further aspect of the invention there is provided apparatus for measuring the delay distortion of a signal transmission circuit between spaced input and output points therein comprising means for supplying a plurality of carrier signals at different frequencies, a source of modulating signal, means for modulating each of the carrier signals with the modulating signal to produce modulated signals having modulation envelopes of coincident phase, means for applying the modulated signals simultaneously to the input point for transmission over the circuit, and means for receiving the modulated signals at the output point and determining any difference in phase between the modulation envelopes thereof. Apparatus may also be provided for transmitting the measurements made at the receiving end back to the transmitting end upon termination of the test transmission.

The invention will be better understood after reading the following detailed description of several presently preferred embodiments thereof with reference to the appended drawings in which.

Figure 1:
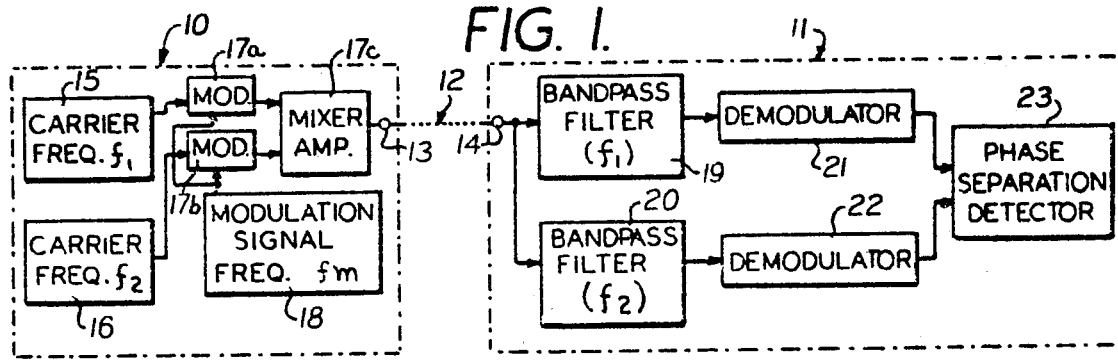
FIG. 1 is a block diagram showing an arrangement for measuring the phase distortion at two different carrier frequencies.

Referring now to FIG. 1, there is shown a test transmitter generally within the outline box 10 and a test receiver shown generally within the outline box 11 coupled to input and output ends of the transmission circuit to be analyzed which is designated generally by the numeral 12. The input point is represented by a terminal 13 while the output point is represented by a terminal 14. The test transmitter 10 includes means for supplying a plurality of carrier signals in the form of crystal controlled or otherwise stabilized carrier frequency oscillators or generators 15 and 16 arranged to provide signals at frequencies $f_1$ and $f_2$, respectively. The signals from the carrier frequency generators 15 and 16 are fed to modulators 17a and 17b which receive modulation signals from the modulation signal generator 18. The frequency of the generator 18 is designated as $f_m$ and may be conveniently of the order of 20 hertz. The modulated carrier frequencies may be combined in a mixer and amplifier 17c in well-known manner and applied simultaneously to the input terminal 13 for transmission over the transmission circuit 12.

At the receiving end of the transmission circuit, the test receiver 11 feeds the modulated signals as received at terminal 14 to the inputs of band-pass filters 19 and 20. The filters 19 and 20 are arranged to have band-pass frequencies of $f_1$ and $f_2$, respectively, corresponding to the frequencies of the carrier frequency sources 15 and 16. The output from filter 19 is fed to demodulator 21 while the output from filter 20 is fed to a corresponding demodulator 22. The outputs from the demodulators 21 and 22 are fed to a phase separation detector 23. Thus, if the transmission circuit 12 introduces different delays for the two carrier frequencies $f_1$ and $f_2$, such delays will be reflected by a lack of phase coincidence in the outputs of the two demodulators 21 and 22. Suck lack of coincidence will be detected and measured by the phase separation detector 23.

It is believed unnecessary to describe in detail the nature of the signal generators, modulators, and related equipment since these circuits are well known and form no part of the present invention.

While some indication as to the phase distortion introduced by a circuit can be obtained from a two-channel system as described with reference to FIG. 1, it is often necessary and desirable to measure the distortion at more than two frequency points. The invention can be applied conveniently to the simultaneous measurement at any number of desired frequencies by extending the concept exemplified by the system of FIG. 2 to which attention is now directed.

A test transmitter 24 is shown connected at terminal 25 to the input of a transmission circuit 26. The far end of the transmission circuit is connected at an input terminal 27 to the test receiver 28. The transmitter 24 is provided with three accurately controlled sources of carrier frequency designated 29, 30 and 31. The frequencies of the sources 29, 30 and 31 are designated, respectively, as $f_1, f_2$ and $f_3$. The carrier frequency sources have their output supplied to three associated modulators 32, 33 and 34. Modulating signals are applied simultaneously to the three modulators from a common source of stabilized modulating frequency $f_m$ designated by the reference numeral 35. In order to remove undesired modulation components, the modulated output from each of the modulators is applied to a corresponding filter designated, respectively, by the reference numerals 36, 37 and 38. Furthermore, in order to compensate for any unequal phase distortion in the three modulators 32, 33 and 34, or in the other parts of the circuits, each of the filters 36, 37 and 38 is equipped with a phase compensation circuit. After applying the output from the filters 36, 37 and 38 to associated amplifiers 39, 40 and 41, the modulation products are combined and applied to the terminal 25 for transmission over the circuit 26.

The test receiver 28 has its terminal 27 connected in parallel to three separate channel amplifiers 42, 43 and 44 whose outputs are connected, respectively, to band-pass filters 45, 46 and 47. The passbands of the filters 45, 46 and 47 are at frequencies $f_1$, $f_2$ and $f_3$, corresponding, respectively, to the chosen frequencies of the carrier frequency sources 29, 30 and 31. The outputs from the filters 45, 46 and 47 are fed to individual phase compensating circuits 48, 49 and 50 for the purpose to be mentioned below. The outputs from the phase compensators are then fed to associated demodulators 51, 52 and 53 and then to associated band-pass filters tuned to the modulation frequency $f_m$ which are designated, respectively, by the reference numerals 54, 55 and 56. The purpose of the filters 54, 55 and 56 is to eliminate any undesirable demodulation products and ensure the presence of a reasonably pure signal at the modulation frequency. The outputs from the filters 54, 55 and 56 are then applied to corresponding buffer amplifiers 57, 58 and 59. The phase compensating circuits 48, 49 and 50 compensate the corresponding channel for any unequal phase delay in the associated amplifiers, filters and demodulator.

As shown in the drawing, the signals obtained from buffer amplifier 57 and 58, corresponding to the carrier frequencies $f_1$ and $f_2$ are applied to a first phase separation detector designated by the reference numeral 60. In similar manner, the outputs from buffer amplifiers 58 and 59 are applied to a second phase separation detector designated 61. It should be understood that having knowledge of the phase separation, if any, between the demodulated envelopes corresponding to carrier frequencies $f_1$ and $f_2$, on the one hand, and carrier frequencies $f_2$ and $f_3$, on the other hand, is adequate to provide information as to the phase separation, if any, between the channels corresponding to carrier frequencies $f_1$ and $f_3$.

Figure 2:
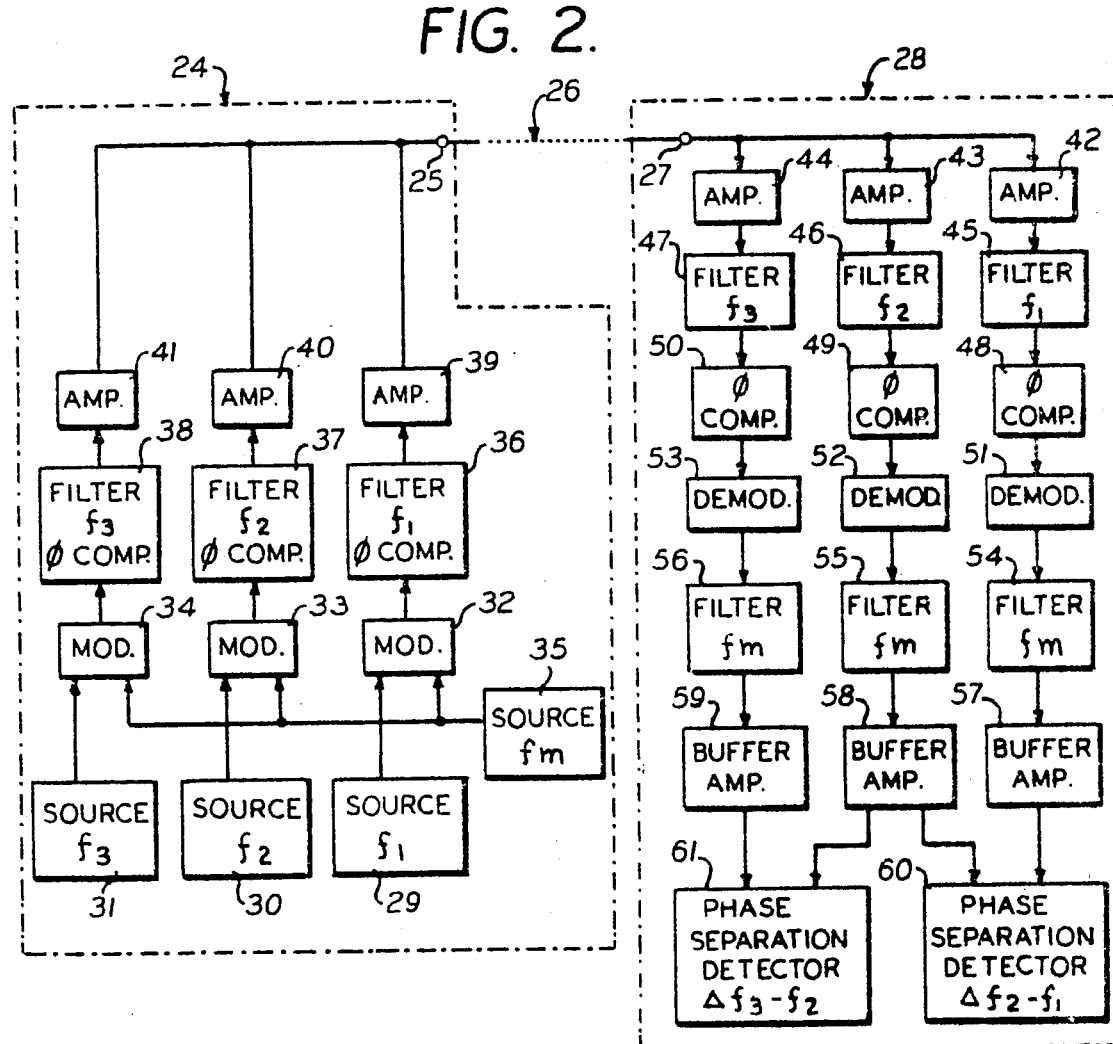
FIG. 2 is a block diagram showing the circuit for measuring phase distortion at three different carrier frequencies.
Figure 3:
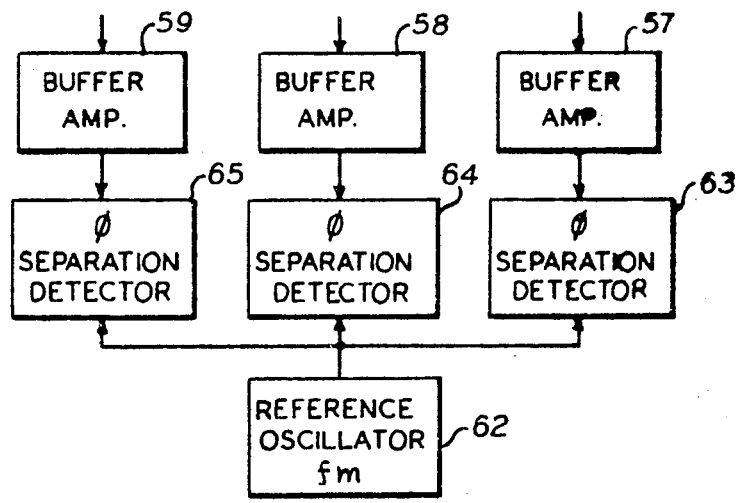
FIG. 3 is a fragmentary block diagram showing a modification of the measuring circuit of FIG. 2.

An alternative arrangement for measuring the phase difference between the demodulation products at the receiver is shown in FIG. 3. A reference oscillator having a frequency $f_m$ corresponding to the original modulation signal frequency and designated by the reference numeral 62 has its output applied in parallel to three phase separation detectors 63, 64 and 65. Also fed to the phase separation detectors are the outputs from the buffer amplifiers 57, 58 and 59 of the FIG. 2 system. Thus, with the arrangement of FIG. 3, instead of comparing the demodulation products of one channel with that of another channel, the demodulation products are each individually compared with the output of a reference oscillator.

In a communication system it is generally desirable to perform the various measurements from a central office or location. It is, therefore, necessary to provide some means for communicating the measurements at the distant point back to the near point. For this purpose it may be convenient to employ the circuit illustrated with reference to FIG. 4 to which attention is now directed.

The test transmitter 66 may take the form of either the transmitter 10 of FIG. 1 or the transmitter 24 of FIG. 2 or an expansion of the latter. Its output is connected through a timing or programming switch 67 to one of the fixed terminals 68 of a multiplexing or time-sharing switch 69. The other fixed terminal 70 of the switch 69 is connected to the input of a decoder and display circuit 71 which will be described further hereinafter.

The armature of switch 69 is connected at terminal 72 to the input of a two-wire transmission circuit 73 which is to be tested. The output of circuit 73 is connected at a terminal 74 to the armature of a second multiplexing or time-sharing switch 75 which is synchronized with switch 69. A first fixed contact 76 of the switch 75 is connected to the input of the test receiver 77. The test receiver 77 may take the form of receiver 11 or 28 depending upon the nature of the test transmitter 66. The output from the test receiver 77 is fed to an encoder 78 whose output is shown connected to the second fixed contact 79 of the switch 75.

Figure 4:
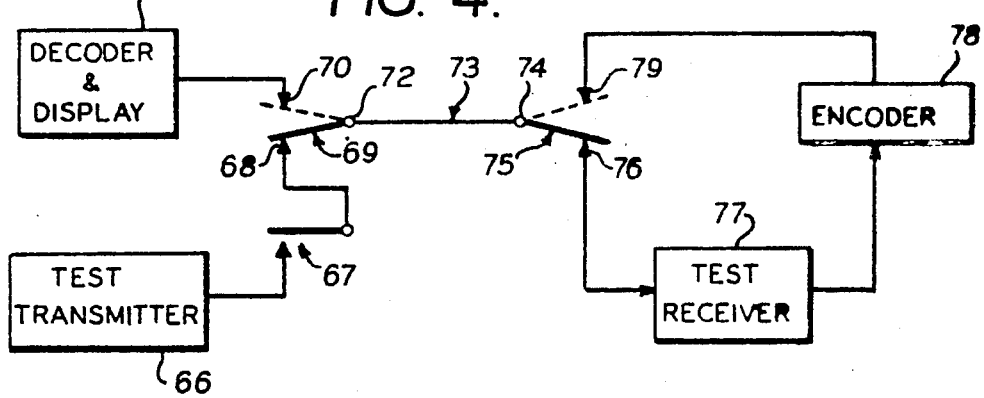
FIG. 4 is a block diagram showing a system arrangement for returning the measured information from the receiving end to the transmitting end when a two-wire transmission circuit is involved.
Figure 5:
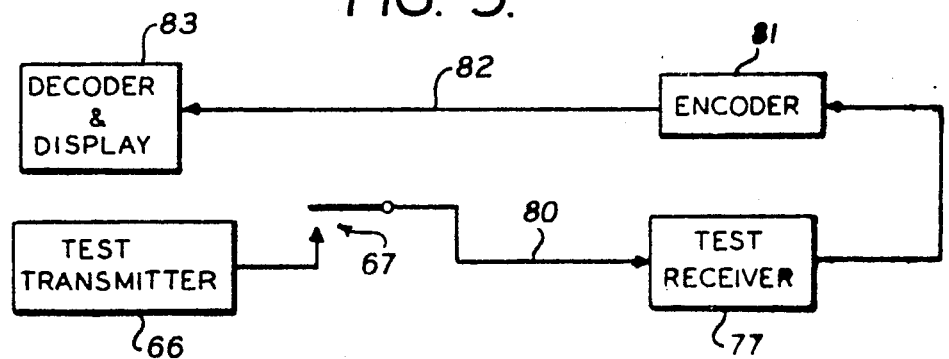
FIG. 5 is a block diagram showing the overall system applied to a four-wire transmission circuit.

The operation of the system of FIG. 4 will now be described. In preparation for a test the switches 69 and 75 will be in the position shown by the solid lines in the drawing. This connects the transmission circuit between the test transmitter 66 and the test receiver 77. When it is desired to perform a test the switch 67 will be closed. This may be periodically or intermittently, as desired. Suitable apparatus in the encoder 78 responsive to the output of the test receiver 77 will store in the encoder the information or measurement provided by each of the phase separation detectors in the test receiver during the transmission of the test signal from the transmitter 66. When the transmission ends by opening of switch 67, the switches 69 and 75 will be activated by means, not shown, to the dotted line positions for connecting the encoder 78 over the circuit 73 back to the decoder and display device 71. At the same time, suitable equipment in the encoder 78, not shown, will activate the encoder to transmit the stored information to the decoder and display apparatus 71. Suitable sequencing or multiplexing apparatus of known construction can be employed in the encoder and decoder for accommodating each of the phase separation detector channels.

Where a four-wire transmission circuit is available, the multiplexing of the circuit of FIG. 4 may be eliminated and, instead, resort may be had to the simplified circuit of FIG. 5. As shown in FIG. 5, the test transmitter 66 is connected via the switch 67 directly to one pair 80 of the four-wire circuit for direct transmission to the test receiver 77. The output of test receiver 77 is applied to encoder 81 for transmission over the second pair 82 of the four-wire circuit to the decoder and display device 83.

The invention has been described with reference to the presently preferred embodiments thereof. It will be understood by those skilled in the art that various changes may be made therein without departing from the true nature of the invention as defined in the appended claims.

What is claimed is:

1. A method for measuring the delay distortion of a signal transmission circuit between spaced input and output points therein comprising the steps of modulating a plurality of different frequency carrier signals with the same modulating signal at the same frequency to produce modulated carrier signals having modulation envelopes of coincident phase, applying said modulated signals simultaneously to said input point for transmission over said circuit, receiving the modulated carrier signals at said output point, and determining any difference in phase between the modulation envelopes of said received signals.

2. A method according to claim 1, wherein the difference in phase is determined by the steps of separately demodulating each of the received signals, and then determining the phase difference between the demodulated signals.

3. A method according to claim 2, wherein at least three of said modulated different frequency carrier signals are applied to said input point, and the phase differences are determined directly between different pairs of the demodulated signals.

4. A method for measuring the delay distortion of a signal transmission circuit between spaced input and output points therein comprising the steps of modulating a plurality of different frequency carrier signals with the same modulating signal at the same frequency to produce modulated carrier signals having modulation envelopes of coincident phase, applying said modulated signals simultaneously to said input point for transmission over said circuit, receiving the modulated carrier signals at said output point, determining at the output point any difference in phase between the modulation envelopes of said received signals, and transmitting the information relative thereto back to said input point.

5. A method according to claim 4, wherein the information relative to said phase difference is subjected to the steps of being stored temporarily upon receipt at said output point and subsequently transmitted back to said input point upon termination of transmission from said input point.

6. Apparatus for measuring the delay distortion of a signal transmission circuit between spaced input and output points therein comprising means for supplying a plurality of carrier signals at different frequencies, a source of modulating signal, means for modulating each of said carrier signals with said modulating signal to produce modulated signals having modulation envelopes of the same frequency and coincident phase, means for applying said modulated signals simultaneously to said input point for transmission over said circuit, and means at said output point for determining any difference in phase between the modulation envelopes of said modulated signals as received thereat.

7. Apparatus according to claim 6, wherein said means at said output point comprises a plurality of demodulating channels, one for each of said modulated signals for the separate demodulating thereof, and means for determining the difference in phase between the demodulated signals obtained from said channels.

8. Apparatus according to claim 7, wherein each of said demodulation channels comprises: filter means for selecting a different one of the modulated signals received at said output point, and a demodulator coupled to an output of said filter means for demodulating the corresponding selected modulated signal.

9. Apparatus according to claim 7, wherein each of said demodulation channels comprises: filter means for selecting a different one of the modulated signals received at said output point, phase compensating means coupled to an output of said filter means for compensating for unequal phase shift in the different channels, and a demodulator coupled to an output of said phase compensating means for demodulating the corresponding selected modulated signal.

10. Apparatus according to claim 9, wherein there are more than two carrier signals and the means for determining the difference in phase between the demodulated signals comprises a separate phase separation detector coupled to different pairs of said demodulators for receiving the demodulated outputs therefrom.

11. Apparatus according to claim 9, wherein the means for determining the difference in phase between the demodulated signals comprises a source of reference signal having the same frequency as said modulating signal, and a separate phase separation detector coupled to both said reference signal source and a different one of said demodulators for determining the phase difference between said reference signal and the demodulated output from the corresponding demodulator.

12. Apparatus according to claim 9, wherein the means for modulating comprise phase compensation means for compensating for unequal phase shift of the respective signals prior to application of the modulated signals to said input point for transmission.

13. Apparatus for measuring the delay distortion of a signal transmission circuit between spaced input and output points therein comprising means for supplying a plurality of carrier signals at different frequencies, a source of modulating signal, means for modulating each of said carrier signals with said modulating signal to produce modulated signals having modulation envelopes of the same frequency and coincident phase, means for applying said modulated signals simultaneously to said input point for transmission over said circuit, means at said output point for determining any difference in phase between the modulation envelopes of said modulated signals as received thereat, and means for transmitting the information relative to said phase difference back to said input point.

14. Apparatus according to claim 13, wherein there is further provided at the output point means for temporarily storing said information relative to said phase difference, and means for initiating said transmission back to said input point upon termination of transmission from said input point.

15. Apparatus according to claim 13, wherein the means for modulating comprise phase compensation means for compensating for unequal phase shift of the respective signals prior to application of the modulated signals to said input point for transmission.

* * * * *